United States Patent Office 3,449,422
Patented June 10, 1969

3,449,422
PENTACYCLOUNDECANE AMINES
Libby S. Miller, Philadelphia, Pa., assignor to Smith Kline & French Laboratories, Philadelphia, Pa., a corporation of Pennsylvania
No Drawing. Filed Feb. 9, 1966, Ser. No. 526,080
Int. Cl. C07c 85/00, 103/02; A61k 27/00
U.S. Cl. 260—563                8 Claims

ABSTRACT OF THE DISCLOSURE

Pentacyclo[6.2.1.0$^{2,7}$.0$^{4,10}$.0$^{5,9}$]undecanes with an amino, aminomethyl, or substituted aminomethyl group at the 2 or 3-position are prepared from simple mono and bicyclic materials. The products have antiviral activity.

This invention relates to pentacycloundecane amines having antiviral activity. In particular, the invention relates to 2-amino and 2-aminomethyl, and 3-amino and 3 - aminomethylpentacyclo[6.2.1.0$^{2,7}$.0$^{4,10}$.0$^{5,9}$]undecanes, having activity against influenza viruses.

The compounds of the invention are represented by the following structural formula:

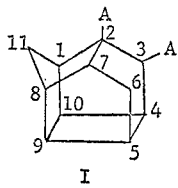

I wherein:

one A group is (alk)$_n$NRR$^1$ and the other A group is hydrogen;

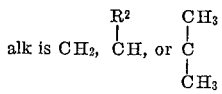

$n$ is 0 or 1;
R is hydrogen or lower alkyl;
R$^1$ is hydrogen, lower alkyl, or lower acyl; and
R$^2$ is lower alkyl.

Also part of the invention are the pharmaceutically acceptable acid addition salts of the basic compounds of Formula I.

The terms "lower alkyl" and "lower acyl" when used to define the compounds of the present invention are intended to represent those alkyl and acyl groups having up to about 4 carbon atoms therein. Such groups as methyl, ethyl, propyl, acetyl, and butyryl are preferred.

The pentacyclic ring system possessed by the compounds of the present invention may alternatively be numbered as pentacyclo[6.3.0.0$^{2,7}$.0$^{4,11}$.0$^{5,9}$]undecane or pentacyclo[5.4.0.0$^{2,6}$.0$^{3,10}$.0$^{5,9}$]undecane. When using such numbering systems, the amino or aminomethyl substituents are at the 4 and 3, or the 9 and 8 positions, respectively. However, the pentacyclo[6.2.1.0$^{2,7}$.0$^{4,10}$.0$^{5,9}$] undecane nomenclature is the preferred designation for the compounds of the invention.

It will be seen that when $n=0$ in Formula I, the compounds have an amino group directly bonded to the ring system. Such compounds with the A group at the 2-position are prepared as follows:

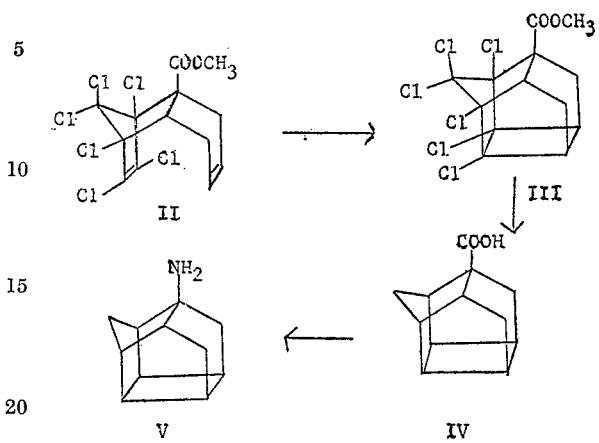

Condensation of methyl propiolate and hexachlorocyclopentadiene results in the formation of methyl 1,4,5, 6,7,7-hexachlorobicyclo[2.2.1]hepta-2,5-diene - 2 - carboxylate. This compound, when treated with butadiene, gives methyl 1,8,9,10,11,11-hexachlorotricyclo[6.2.1.0$^{2,7}$] undeca-4,9-diene-2-carboxylate (II). Irradiation of this diene with ultraviolet light gives the full cage methyl 1,8,9,10,11,11 - hexachloropentacyclo[6.2.1.0$^{2,7}$.0$^{4,10}$.0$^{5,9}$] undecane-2-carboxylate (III). The ester is conventionally hydrolyzed to the corresponding useful acid intermediate with a basic reagent such as aqueous alcoholic sodium hydroxide, and the resulting hexachloroacid is dechlorinated with lithium in tert-butanol to give compound IV. The acid is converted to the amine V, which is the preferred compound of the invention, by the Curtius or Schmidt procedures. The Curtius procedure involves formation of an acid chloride, conversion to the azide and then the isocyanate, and hydrolysis to the amine. The Schmidt reaction consists of treating the acid with sodium azide and sulfuric acid.

The carboxylic acid IV is converted into a variety of compounds of Formula I in which $n=1$. The acid is converted to its acid chloride with thionyl chloride, and treatment with ammonia gives an amide. Reduction of the amide gives a 2-aminomethyl compound (Formula I, where alk is CH$_2$ and $n=1$). Use of primary or secondary amines in place of ammonia gives N-substituted aminomethyl compounds. Treatment of the acid chloride with methyl magnesium chloride gives an α,α-dimethylmethanol, which, when treated with conc. sulfuric acid and acetonitrile, gives an N-acetyl-α,α-dimethylmethylamine. Hydrolysis of the acetyl group gives the α,α-dimethylmethylamine (Formula I, where alk is

and $n=1$). When the carboxylic acid is allowed to react with a lower alkyl lithium compound, a lower alkyl ketone is obtained. The ketone is converted to its oxime, and the oxime reduced either catalytically or with lithium aluminum hydride to give the α-lower alkylmethylamine (Formula I, where alk is

and $n=1$).

Compounds of this invention in which the A group of Formula I is at the 3-position, are prepared as follow:

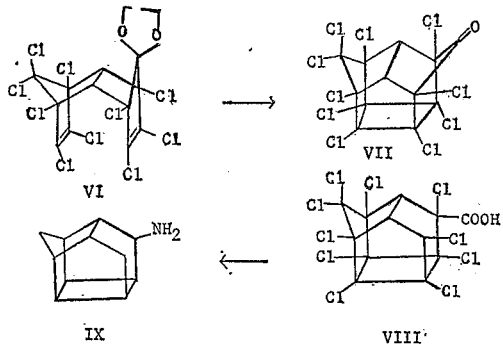

1,2,3,4,7,7 - hexachlorobicyclo[2.2.1]hepta - 2,5-diene and tetrachlorocyclopentadienone cyclic ethylene ketal are condensed in a Diels-Alder reaction to give 1,3,4,5,6,8,9, 10,12,12 - decachlorotetracyclo[6.2.1.1$^{3,6}$.0$^{2,7}$]dodeca-4,9-dien-11-one ethylene ketal (VI). This diene is irradiated with ultraviolet light to give the decachloro full cage ketal and the ketal then hydrolyzed with mineral acid to give compound VII. When this compound is refluxed with a strong base such as aqueous potassium hydroxide, the useful intermediate decachloro acid VIII is obtained. Dechlorination with lithium in tert-butanol, followed by conversion of the carboxyl group to an amino group by either the Schmidt or Curtius procedures gives tthe 3-amino compound IX. The various homologs of this amine which are within the scope of Formula I when $n=1$ are prepared by the procedures described above for the 2-isomer.

The various primary amino and aminomethyl compounds of this invention are readily converted into alkyl, dialkyl, or acyl derivatives by well-known procedures. A lower alkylamine is prepared by treatment of the amine with a lower alkyl halide or sulfate. An acylamine is prepared by treatment with an acyl halide or anhydride. An alkylamine is also prepared by reduction of an acylamine with lithium aluminum hydride. Dilower alkylamines are prepared by acylating an alkylamine and then reducing the acylalkylamine with a reagent such as lithium aluminum hydride. A methylamino compound is prepared by reaction of methanol with a bicyclic isocyanate, followed by reduction of the resulting carbamate with lithium aluminum hydride. A dimethylamino compound is best prepared by heating the primary amine with 90% formic acid and 35% formaldehyde. Substituted aminomethyl compounds may be prepared, in addition to those methods described above, by treatment of the corresponding acid chloride with a primary or secondary amine, followed by reduction.

The basic amine compounds of the invention may be converted to any of a variety of pharmaceutically acceptable acid addition salts by adding an acid, either as such or in the form of an alcoholic, ethereal, or acetone solution, to a solution of the basic amine compound. Among the pharmaceutically acceptable acids which may be used to form the salts are hydrochloric, which is preferred, sulfuric, hydrobromic, citric, pamoic, maleic, cyclohexylsulfamic, nitric, acetic, tartaric, and succinic.

Since the carbon atoms to which the amino or aminomethyl groups are attached in the compounds of this invention are asymmetric, it will be apparent that these product compounds exist in the form of racemic mixtures. Inasmuch as separation of racemic mixtures by various methods is known to the art of organic chemistry, the present invention is intended to embrace the racemic mixtures of these compounds as well as the separated optically active forms.

The antiviral compounds of the invention are active against Asian and swine influenza viruses. They are effective in infected mice when administered subcutaneously in the form of aqueous solutions of their hydrochloric salts at doses of 25–50 mg./kg.

The following examples are intended to illustrate the preparation of the compounds of the invention, but are not to be construed as limiting the scope thereof.

EXAMPLE 1

Pentacyclo[6.2.1.0$^{2,7}$.0$^{4,10}$.0$^{5,9}$]undecane-2-carboxylic acid

Methyl propiolate (45 g., 0.536 mole) and hexachlorocyclopentadiene (132 g., 0.485 mole) are refluxed at 125–130° for sixteen hours. The dark liquid is triturated with 100 ml. of methanol, forming a heavy yellow precipitate which is collected, washed with methanol, and dried. The methyl 1,4,5,6,7,7 - hexachlorobicyclo[2.2.1]hepta - 2,5-diene-2-carboxylate obtained is recrystallized from methanol and sublimed; M.P. 86–88.5°.

This ester (61 g., 0.171 mole), 28 ml. (0.34 mole) of butadiene, and 0.34 g. of hydroquinone are dissolved in 30 ml. of toluene and heated in a bomb at 140° for 9 hours. The solvent is evaporated and the residue dissolved in boiling hexane. The solution is then filtered and methyl 1,8,9,10,11,11 - hexachlorotricyclo[6.2.1.0$^{2,7}$]undeca-4,9-diene-2-carboxylate allowed to crystallize. Recrystallization from methanol and sublimation at 85°/0.05–0.1 mm. gives the pure tricyclic ester, M.P. 91.5–94°.

*Analysis.*—Calc'd (percent) for $C_{13}H_{10}O_2Cl_6$: C, 37.99; H, 2.45; Cl, 51.77. Found (percent): C, 38.20; H, 2.42; Cl, 52.25.

This ester (24 g.) is dissolved in 1 liter of acetone and irradiated with a 450 watt Hanovia mercury vapor lamp in a quartz apparatus for three-quarters of an hour. The solvent is evaporated in vacuo, and the residue triturated with methanol, kept in a freezer for several hours, and then collected, washed with ice cold methanol and dried on a porous plate. Recrystallization gives methyl 1,8,9,10, 11,11-hexachloropentacyclo-[6.2.1.0$^{2,7}$.0$^{4,10}$.0$^{5,9}$]undecane-2-carboxylate, M.P. 151–153.5°.

*Analysis.*—Calc'd (percent) for $C_{13}H_{10}O_2Cl_6$: C, 37.99; H, 2.45; Cl, 51.77. Found (percent): C, 37.93; H, 2.41; Cl, 51.72.

This pentacycloester (14.2 g., 0.0346 moles) is suspended in a mixture of 200 ml. of 95% alcohol and 200 ml. of 10% sodium hydroxide, and refluxed for two and one-half hours. The reaction is cooled and evaporated to one-half volume. An additional 400–500 ml. of water is added and the mixture is acidified and chilled. The precipitated hexachloro 2-carboxylic acid is collected, washed with water, and dried. Recrystallization from methanol-water mixtures gives a pure sample, M.P. >300°.

*Analysis.*—Calc'd (percent) for $C_{12}H_8O_2Cl_6$: C, 36.31; H, 2.03; Cl, 53.6. Found (percent): C, 36.36; H, 2.00; Cl, 53.94.

The hexachloro acid (12.65 g., 0,0319 mole) is dissolved in 200 ml. of dry tetrahydrofuran, and 36 ml. (0.383 mole) of dry tert-butanol is added, followed by 5.3 g. (0.765 mole) of lithium wire, cut into small pieces. The reaction mixture is stirred vigorously under nitrogen, and the spontaneous refluxing is controlled with an ice bath. The mixture is then refluxed for one and one-half hours using an external heat source when needed. The mixture is cooled and an additional 36 ml. of tert-butanol and 5.3 g. of lithium wire added. The subsequent vigorous reflux is controlled with ice and the mixture refluxed for another hour. The mixture is cooled and poured into 1 liter of ice water. When all the lithium has been decomposed, the solution is acidified with conc. hydrochloric acid and extracted with an ether-benzene mixture. The organic phase is washed with 3 N hydrochloric acid, filtered and evaporated in vacuo. The residue is dissolved in 120 ml. of ethyl acetate and cyclohexylamine is added until the solution is basic. The cyclohexylamine salt of the dechlorinated title acid which precipitates is collected, washed with ethyl acetate, and dried. Recrystallization from ethyl acetate gives the pure salt, M.P. 172–175° dec. The free title acid is obtained by dissolving the salt in water, acidifying with hydrochloric acid, and extracting with benzene-ether. Evaporation of the washed and dried organic extracts gives the acid, which is recrystallized from 3:2 methanol-water.

EXAMPLE 2

2-aminopentacyclo[6.2.1.0$^{2,7}$.0$^{4,10}$.0$^{5,9}$]undecane

Pentacyclo[6.2.1.0$^{2,7}$.0$^{4,10}$.0$^{5,9}$]undecane - 2 - carboxylic acid (Example 1, 3 g., 0.0158 mole) is stirred in 30 ml. of thionyl chloride for 17 hours at room temperature. The thionyl chloride is evaporated in vacuo using benzene to remove the last traces. The resulting acid chloride is dissolved in 150 ml. of acetone and the solution chilled to 0°. A solution of 1.2 g. (0.0185 mole) of sodium azide in 12 ml. of water is added to the stirred solution, which is then stirred at 0–5° for 15 minutes. The solution is poured into 200 ml. of ice water and extracted with 250 ml. of toluene. The toluene phase containing the acid azide is washed with water, dried, and heated on a steam bath for 20 minutes and then refluxed for 1 hour. The toluene is evaporated to give an isocyanate, which is dissolved in 96 ml. of acetone. Conc. hydrochloric acid is added (24 ml.) and the solution is refluxed for 1 hour. The acetone is evaporated, water is added, and the solution extracted with benzene. The aqueous phase is made basic with 10% sodium hydroxide and the free amine product extracted with benzene. The amine is obtained by washing, drying, and evaporating the benzene extracts.

The amine is dissolved in a small volume of isopropanol and ethereal hydrogen chloride added. The ether is evaporated, additional isopropanol is added and the mixture warmed until solution occurs. Ethyl acetate is then added and the amine hydrochloride precipitates, M.P. >300°.

A hexamate salt is obtained by dissolving the amine in acetonitrile and adding a solution of hexamic acid in 10% water-90% acetonitrile. Recrystallization of the precipitated product from water-acetonitrile gives the pure salt, M.P. 185–190° dec.

EXAMPLE 3

1,3,4,5,6,8,9,10,11,11-decachloropentacyclo[6.2.1.0$^{2,7}$.0$^{4,10}$.0$^{5,9}$]undecane-3-carboxylic acid 1,2,3,4,7,7-hexachlorobicyclo[2.2.1]hepta - 2,5 - diene (460 g.) is heated in a 145° oil bath, and 45 g. (0.17 mole) of tetrachlorocyclopentadienone cyclic ethylene ketal is added in four equal portions at one hour intervals. The mixture is heated at 145° for a total of about 6½ hours and then cooled, 700 ml. of methanol is added, and the solution is scratched and chilled. The precipitate is collected and dried, and then stirred for ¾ hour in 1500 ml. of cyclohexane. The solution is filtered with the aid of charcoal, the filtrate evaporated in vacuo, and the resulting white solid recrystallized from absolute ethanol to give 1,3,4,5,6,8,9,10,12,12-decachlorotetracyclo[6.2.1.1$^{3,6}$.0$^{2,7}$]dodeca-4,9-dien-11-one cyclic ethylene ketal, M.P. 227.5–229°.

The above diene (15.5 g.) is dissolved in 800 ml. of acetone and the solution is then irradiated with a 450 watt Hanovia Hg vapor lamp in a quartz apparatus for one hour and twenty minutes. The solvent is evaporated in vacuo and the residual white solid collected, washed with cold methanol, and recrystallized from absolute ethanol to give 1,3,4,5,6,8,9,10,12,12-decachlorohexacyclo[6.2.1.1$^{3,6}$.0$^{2,7}$.0$^{4,10}$.0$^{5,9}$]dodecane-11-one cyclic ethylene ketal, M.P. 183.5–185.5°.

This ketal (10 g.) is suspended in 100 ml. of 50% sulfuric acid and heated for 1 hour in a 50° oil bath. The mixture is cooled and poured into 1 liter of ice water. The aqueous mixture is extracted with ether and the organic extracts are washed, dried, and evaporated in vacuo to give the corresponding ketone product.

A suspension of 5 g. of 1,3,4,5,6,8,9,10,12,12-decachlorohexacyclo[6.2.1.1$^{3,6}$.0$^{2,7}$.0$^{4,10}$.0$^{5,9}$]dodecan-11 - one in 125 ml. of 50% aqueous potassium hydroxide is refluxed for 20 minutes, cooled, and poured into 500 ml. of water. Ethanol (125 ml.) is added, the pH is brought to 7 with hydrochloric acid, the solution is filtered, and acid again added to pH 1. The mixture is stirred and filtered, and the recovered solid washed with water to give 1,3,4,5, 6,8,9,10,11,11 - decachloropentacyclo[6.2.1.0$^{2,7}$.0$^{4,10}$.0$^{5,9}$] undecane-3-carboxylic acid, M.P. >300°.

EXAMPLE 4

3-aminopentacyclo[6.2.1.0$^{2,7}$.0$^{4,10}$.0$^{5,9}$]undecane

One inch pieces of lithium wire (4.95 g., 0.714 g-atoms) are added to a solution of 9.6 g. (.0179 mole) of the decachloro acid of Example 3 in 150 ml. of dry tetrahydrofuran and 33.5 ml. (.357 mole) of tert-butanol. Nitrogen is bubbled through the reaction vessel and the mixture is stirred vigorously. Heat evolution is controlled by means of an ice bath and the mixture is allowed to reflux for a total of one hour, heat being applied as necessary. The mixture is cooled, an additional 17 ml. of tert-butanol and 2.5 g. of lithium wire are added, and the mixture is then refluxed for 50 minutes. The reaction mixture is then cooled and poured into 750 ml. of ice water. After the ensuing exothermic reaction has subsided, the mixture is extracted with 1:1 benzene-ether, and the organic phase is washed with water, filtered, and evaporated in vacuo. The residual yellow liquid is triturated with a small volume of methanol, chilled and scratched, and the resulting white solid collected. Recrystallization gives pentacyclo[6.2.1.0$^{2,7}$.0$^{4,10}$.0$^{5,9}$]undecane - 3-carboxylic acid.

This dechlorinated 3-carboxylic acid is converted to its acid chloride with thionyl chloride, the acid chloride is converted to the acid azide with sodium azide, the azide is converted to the isocyanate by heating, and the isocyanate is hydrolyzed with hydrochloric acid, all as described in Example 2 to give 3 - aminopentacyclo-[6.2.1.0$^{2,7}$.0$^{4,10}$.0$^{5,9}$]undecane. The hydrochloride or other salt is prepared in the conventional manner.

EXAMPLE 5

2-methylaminopentacyclo[6.2.1.0$^{2,7}$.0$^{4,10}$.0$^{5,9}$]undecane

Pentacyclo[6.2.1.0$^{2,7}$.0$^{4,10}$.0$^{5,9}$]undecane - 2 - isocyanate (3.74 g., .02 mole) is dissolved in 60 ml. of methanol and the solution is then refluxed for 2 hours. The solvent is evaporated in vacuo, 50 ml. of dry tetrahydrofuran is added to the resulting carbamate, and the mixture is refluxed with 0.76 g. of lithium aluminum hydride for four hours. The reaction mixture is decomposed with water and filtered, and the filtrate evaporated to give the title product. The pure product is obtained either by distillation or by conversion from a previously recrystallized hydrochloride salt.

EXAMPLE 6

2-aminomethylpentacyclo[6.2.1.0$^{2,7}$.0$^{4,10}$.0$^{5,9}$]undecane

A solution of 5.70 g. (.03 mole) of pentacyclo-[6.2.1.0$^{2,7}$.0$^{4,10}$.0$^{5,9}$]undecane-2-carboxylic acid in 25 ml. of thionyl chloride is refluxed for 2 hours and then allowed to stand overnight at room temperature. The excess thionyl chloride is evaporated in vacuo, the residual oil is taken up in benzene, and the solution further evaporated to give the acid chloride.

This acid chloride is dissolved in 15 ml. of dry tetrahydrofuran and the solution added dropwise to an ice-cold solution of conc. aqueous ammonia (ca. 75 ml.). After stirring for 1 hour, water is added, and the amide either removed by filtration or extracted with an organic solvent.

To a slurry of 3.04 g. of lithium aluminum hydride in 400 ml. of refluxing tetrahydrofuran is added in portions, over 1 hour, 3.78 g. of this amide, all under nitrogen. The mixture is heated at reflux for 24–48 hours, cooled, and the excess hydride decomposed by the cautious addition of water. The resulting white slurry is filtered, the filter cake washed with ether, and the filtrates combined and evaporated in vacuo to give the title aminomethyl product.

The 3-aminomethyl compound is prepared from the 3-carboxylic acid by the same method as described above.

EXAMPLE 7

3-dimethylaminopentacyclo[6.2.1.0$^{2,7}$.0$^{4,10}$.0$^{5,9}$]undecane 3-aminopentacycl[6.2.1.0$^{2,7}$.0$^{4,10}$.0$^{5,9}$]undecane (1.5 g.) is mixed with 0.5 mole of 90% formic acid and 0.22 mole of 35% formaldehyde solution. The mixture is heated for 12 hours on the steam bath, 50 ml. of conc. hydrochloric acid is then added, and the mixture evaporated to dryness in vacuo. To the residue is added 200 ml. of 1 N sodium hydroxide. The product is obtained by extraction with ether and drying and evaporating the ether. The pure product is obtained by distillation or by conversion from a previously purified hydrochloride salt.

EXAMPLE 8

2-acetamidopentacyclo[6.2.1.0$^{2,7}$.0$^{4,10}$.0$^{5,9}$]undecane

2 - aminopentacyclo[6.2.1.0$^{2,7}$.0$^{4,10}$.0$^{5,9}$]undecane (3.22 g., .02 mole) is allowed to stand overnight with 5 g. of acetic anhydride in 100 ml. of pyridine. The reaction mixture is then diluted with ice water and the amide product removed by filtration or extracted with a solvent such as ether or chloroform. Recrysatllization yields the pure product.

EXAMPLE 9

2-(N-ethylacetamido)pentacyclo[6.2.1.0$^{2,7}$.0$^{4,10}$.0$^{5,9}$]undecane

A solution of 2.03 g. (0.1 mole) of the amide of Example 8 in 50 ml. of dry tetrahydrofuran is refluxed for 2 hours with 0.45 g. of 53.5% sodium hydride. A solution of 1.56 g. of ethyl iodide in 25 ml. of dry tetrahydrofuran is added to the cooled reaction mixture which is then refluxed for twelve hours. A small amount of water is cautiously added with cooling, the solution is filtered, and most of the tetrahydrofuran evaporated in vacuo. A further quantity of water is added, the alkaline solution is extracted with ether, and the extracts dried and evaporated to give the title product.

EXAMPLE 10

2-diethylaminopentacyclo[6.2.1.0$^{2,7}$.0$^{4,10}$.0$^{5,9}$]undecane

A solution of 2.31 g. (.01 mole) of the N-ethylacetamido compound of Example 9 in 100 ml. of dry tetrahydrofuran is refluxed with 0.5 g. of lithium aluminum hydride for 12 hours. The excess hydride is decomposed by the cautious addition of water, with cooling. The solution is filtered, the filtrate extracted with ether, and the ether extracts evaporated to give the diethylamino product.

Reduction of the 2-acetamido compound of Example 8 in the same manner gives the 2-ethylamino compound.

EXAMPLE 11

2-propylaminopentacyclo[6.2.1.0$^{2,7}$.0$^{4,10}$.0$^{5,9}$]undecane

To a stirred solution of 250 ml. of absolute alcohol, 25 g. of sodium bicarbonate, and 19.8 g. (0.1 mole) of 2-aminopentacyclo[6.2.1.0$^{2,7}$.0$^{4,10}$.0$^{5,9}$]undecane hydrochloride is added 17.0 g. of propyl iodide. The mixture is warmed and maintained at a temperature sufficient to cause the evolution of carbon dioxide until the gas evolution ceases. The mixture is cooled and filtered, and the solvent evaporated. Sodium hydroxide (10%) is added to the residue, and the basic mixture extracted with ether. The ether extracts are dried and evaporated to give an oil which is distilled to give the title product.

EXAMPLE 12

α,α-Dimethylpentacyclo[6.2.1.0$^{2,7}$.0$^{4,10}$.0$^{5,9}$]undecane-2-methylamine To a solution of 33.5 g. of pentacyclo[6.2.1.0$^{2,7}$.0$^{4,10}$.0$^{5,9}$]undecane-2-carboxylic acid chloride in 500 ml. of anhydrous ether under a nitrogen atmosphere is added dropwise 150 ml. of commercial 3 M methyl magnesium bromide at a rate which maintains a gentle reflux. The reaction mixture is heated for 1 hour after the addition, then cooled. To decompose the metal complex, 300 ml. of saturated ammonium chloride is added. The ether layer is separated and the aqueous layer is extracted with 100 ml. of chloroform. This extract is combined with the ether layer, and the mixture is dried with anhydrous magnesium sulfate and vacuum-concentrated to dryness at 35° C. The residue is steam-distilled until the distillate is no longer milky, about 3 liters of distillate being collected. After cooling, the steam distillate is extracted with two 250 ml. portions of ether, which are combined, dried with anhydrous magnesium sulfate, and vacuum concentrated to yield α,α-dimethylpentacyclo[6.2.1.0$^{2,7}$.0$^{4,10}$.0$^{5,9}$]undecane-2-methanol.

A 35 ml. amount of concentrated sulfuric acid is added dropwise, with cooling to hold the temperature below 10° C., to 160 ml. of acetonitrile. Then, 22.9 g. of α,α-dimethylpentacyclo[6.2.1.0$^{2,7}$.0$^{4,10}$.0$^{5,9}$]undecane-2-methanol is added. The temperature is raised to 48° C. and maintained at 48° C. for 45 minutes. The reaction mixture is allowed to cool to room temperature and is then slowly poured into 1000 ml. of ice water. The solids which separate are filtered and dried and then taken up in 500 ml. of ether. Dry hydrogen chloride is bubbled into the ether solution until no further precipitation occurs. The solids are filtered, dried, and placed in a separatory funnel containing 200 ml. of water and 500 ml. of ether. This is shaken until the solids dissolve, and the aqueous layer is separated and discarded. The ether solution is dried with anhydrous sodium sulfate and concentrated to dryness to give N-acetyl-α,α-dimethylpentacyclo-[6.2.1.0$^{2,7}$.0$^{4,10}$.0$^{5,9}$]undecane-2-methylamine.

A mixture of 2.2 g. of N-acetyl-α,α-dimethylpentacyclo[6.2.1.0$^{2,7}$.0$^{4,10}$.0$^{5,9}$]undecane-2-methylamine, 10 g. of potassium hydroxide and 40 ml. of methanol is heated at 225° C. in a sealed tube for 18 hours, then cooled. The tube contents are added to 100 ml. of water, and the mixture is extracted with two 50 ml. portions of ether. The extracts are combined, dried with potassium hydroxide, and evaporated to give the title amine product. A hydrochloride is prepared by bubbling hydrogen chloride into an ether solution of the amine until precipitation is complete. The salt is filtered off, dried, and recrystallized to give the pure hydrochloride.

EXAMPLE 13

α-Methylpentacyclo[6.2.1.0$^{2,7}$.0$^{4,10}$.0$^{5,9}$]undecane-2-methylamine

Pentacyclo[6.2.1.0$^{2,7}$.0$^{4,10}$.0$^{5,9}$]undecane - 2 - carboxylic acid (5.8 g., 0.0306 mole) is dissolved in 100 ml. of dry tetrahydrofuran and, with stirring under nitrogen, 31 ml. (0.062 mole) of 2 N methyl lithium in ether is added over 3 to 4 minutes. The mixture is refluxed overnight and cooled to room temperature. Water (25 ml.) is added, and the product extracted into ether. After drying over magnesium sulfate, the ether is removed to yield pentacyclo[6.2.1.0$^{2,7}$.0$^{4,10}$.0$^{5,9}$]undec-2-yl methyl ketone.

To a mixture of 5.75 g. of this ketone, 3.22 g. (0.0463 mole) of hydroxylamine hydrochloride, and 15 ml. of ethanol are added, portionwise with stirring, 3 ml. of water and 5.9 g. (0.147 mole) of powdered sodium hydroxide. The reaction mixture is stirred and refluxed for 5 minutes and then poured into an ice cold solution of 20 ml. (0.240 mole) of concentrated hydrochloric acid in 110 ml. of water. The colorless solid is filtered and washed with water. After drying over phosphorous pentoxide, the oxime of the ketone is obtained.

A solution of 4.45 g. of the oxime in 50 ml. of tetrahydrofuran is added to a stirred suspension of 2.93 g. (0.077 mole) of lithium aluminum hydride in 75 ml. of ether. The mixture is stirred and refluxed overnight. After cooling to room temperature, 7 ml. (7.0 g., 0.0389 mole) of water is added dropwise, and the mixture is stirred 1 hour at room temperature. The solid is filtered and washed well with ether. The ether is dried with solid potassium hydroxide and then with magnesium sulfate, and the product obtained by removal of the ether. The hydrochloride salt is obtained by bubbling dry hydrogen chloride into an ether solution of the product amine until precipitation is complete, filtering off and drying the precipitate, and then recrystallizing the salt. Other α-lower alkyl derivatives are prepared by substituting an equivalent amount of ethyl lithium, propyl lithium, or butyl lithium for the methyl lithium.

I claim:
1. A compound of the formula

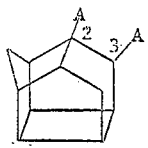

wherein:
one A group is $(alk)_nNRR^1$ and the other A group is hydrogen;

alk is $CH_2$, $\overset{R^2}{\underset{}{CH}}$, or $\overset{CH_3}{\underset{CH_3}{C}}$ $n$ is 0 or 1;
R is hydrogen or lower alkyl;
$R^1$ is hydrogen or lower alkyl; and
$R^2$ is lower alkyl;
or a pharmaceutically acceptable acid addition salt thereof.

2. A compound as claimed in claim 1, in which the A group at the 2-position is $(alk)_nNRR^1$.

3. A compound as claimed in claim 1 in which the A group at the 3-position is $(alk)_nNRR^1$.

4. A compound as claimed in claim 2, in which R and $R^1$ are hydrogen or methyl and $R^2$ is methyl.

5. A compound as claimed in claim 3, in which R and $R^1$ are hydrogen or methyl and $R^2$ is methyl.

6. A compound as claimed in claim 4, in which $n$ is 0 and R and $R^1$ are hydrogen.

7. The hydrochloride salt of a compound of the formula

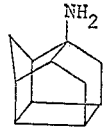

8. A compound of the formula

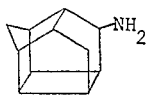

or its hydrochloride salt.

References Cited

UNITED STATES PATENTS 3,352,912  11/1967  Richard _____ 260—563

CHARLES B. PARKER, Primary Examiner.

P. C. IVES, Assistant Examiner.

U.S. Cl. X.R.

204—158; 260—340.9, 468, 501.1, 501.12, 514, 557, 561, 586; 424—325